US011670292B2

United States Patent
Cardinaux et al.

(10) Patent No.: US 11,670,292 B2
(45) Date of Patent: Jun. 6, 2023

(54) ELECTRONIC DEVICE, METHOD AND COMPUTER PROGRAM

(71) Applicant: Sony Corporation, Tokyo (JP)

(72) Inventors: Fabien Cardinaux, Stuttgart (DE); Marc Ferras Font, Stuttgart (DE)

(73) Assignee: SONY CORPORATION, Tokyo (JP)

(*) Notice: Subject to any disclaimer, the term of this patent is extended or adjusted under 35 U.S.C. 154(b) by 128 days.

(21) Appl. No.: 16/783,183

(22) Filed: Feb. 6, 2020

(65) Prior Publication Data

US 2020/0312322 A1 Oct. 1, 2020

(30) Foreign Application Priority Data

Mar. 29, 2019 (EP) .................................... 19166137

(51) Int. Cl.
| | |
|---|---|
| *G10L 15/22* | (2006.01) |
| *G10L 25/24* | (2013.01) |
| *G10L 19/00* | (2013.01) |
| *G06N 3/08* | (2023.01) |
| *G10L 15/16* | (2006.01) |
| *G10L 15/02* | (2006.01) |
| *G10L 13/00* | (2006.01) |

(52) U.S. Cl.
CPC ................ *G10L 15/22* (2013.01); *G06N 3/08* (2013.01); *G10L 13/00* (2013.01); *G10L 15/02* (2013.01); *G10L 15/16* (2013.01); *G10L 19/00* (2013.01); *G10L 25/24* (2013.01)

(58) Field of Classification Search
CPC ......... G10L 15/22; G10L 13/00; G10L 25/24; G10L 19/00; G10L 15/16; G10L 15/02; G10L 21/02; G06N 3/08; G06N 3/0454
See application file for complete search history.

(56) References Cited

U.S. PATENT DOCUMENTS

| | | | | |
|---|---|---|---|---|
| 8,527,276 | B1* | 9/2013 | Senior ..................... | G06N 3/084 704/259 |
| 10,186,252 | B1* | 1/2019 | Mohammadi ........... | G10L 13/10 |
| 2008/0077404 | A1* | 3/2008 | Akamine .............. | G10L 15/065 704/243 |
| 2014/0222428 | A1* | 8/2014 | Cumani .................. | G10L 17/02 704/250 |
| 2016/0329043 | A1 | 11/2016 | Kim et al. | |
| 2017/0092268 | A1* | 3/2017 | Kristjansson ........... | G10L 15/16 |
| 2018/0096677 | A1* | 4/2018 | Pollet ...................... | G10L 13/04 |
| 2018/0197534 | A1* | 7/2018 | Li ........................... | G10L 15/20 |
| 2018/0233127 | A1* | 8/2018 | Visser ..................... | G10L 15/26 |

(Continued)

FOREIGN PATENT DOCUMENTS

WO WO-2017142775 A1 * 8/2017 ........... G10L 13/033

OTHER PUBLICATIONS

Le, D., Licata, K., & Provost, E. M. (2018). Automatic quantitative analysis of spontaneous aphasic speech. Speech Communication, 100, 1-12. (Year: 2019).*

(Continued)

*Primary Examiner* — Paras D Shah
*Assistant Examiner* — Nandini Subramani
(74) *Attorney, Agent, or Firm* — Xsensus LLP

(57) ABSTRACT

An electronic device comprising circuitry configured to perform a transcript based voice enhancement based on a transcript to obtain an enhanced audio signal.

14 Claims, 12 Drawing Sheets

(56) References Cited

U.S. PATENT DOCUMENTS

2018/0365554 A1* 12/2018 van den Oord ........ G06N 3/088
2020/0335108 A1* 10/2020 Meng ...................... G10L 17/18

OTHER PUBLICATIONS

Le, D., Licata, K., & Provost, E. M. (2018) "Automatic quantitative analysis of spontaneous aphasic speech", Speech Communication, 100, 1-12 (Year: 2018).*

Lei, Y., Scheffer, N., Ferrer, L., & McLaren, M. (May 2014). A novel scheme for speaker recognition using a phonetically-aware deep neural network. In 2014 IEEE international conference on acoustics, speech and signal processing (ICASSP) (pp. 1695-1699) (Year: 2014).*

Y. Qian, Y. Fan, W. Hu and F. K. Soong, "On the training aspects of Deep Neural Network (DNN) for parametric TTS synthesis," 2014 IEEE International Conference on Acoustics, Speech and Signal Processing (ICASSP), 2014, pp. 3829-3833 (Year: 2014).*

Le, D., Licata, K., & Provost, E. M. (2017) "Automatic Paraphasia Detection from Aphasic Speech: A Preliminary Study" In Interspeech (pp. 294-298) (Year: 2017).*

Meng, Z., Li, J., & Gong, Y. (2018). Adversarial feature-mapping for speech enhancement. arXiv preprint arXiv:1809.02251 (Year: 2018).*

Wang, Zhong-Qiu, et.al.. "Phoneme-specific speech separation." 2016 IEEE International Conference on Acoustics, Speech and Signal Processing (ICAASP). IEEE, 2016 (Year: 2016).*

Sun, Sining, et al. "An unsupervised deep domain adaptation approach for robust speech recognition." Neurocomputing 257 (2017): 79-87 (Year: 2017).*

Dehak, N., et al., "Front-End Factor Analysis for Speaker Verification," IEEE Transactions on Audio, Speech, and Language Processing, vol. 19, No. 4, May 2011, pp. 788-798.

Griffin, D.W., and Lim, J.S., "Signal Estimation from Modified Short-Time Fourier Transform," IEEE Transactions on Acocstics, Speech, and Signal Processing, vol. ASSP-32, No. 2, Apr. 1984, pp. 236-243.

Kneser, R., and Ney, H., "Improved backing-off for M-gram language modeling," International Conference on Acoustics, Speech, and Signal Processing, vol. 1, May 1995, pp. 181-184.

Le, D., et al., "Automatic Assessment of Speech Intelligibility for Individuals With Aphasia," IEEE/ACM Transactions on Audio, Speech, and Language Processing, vol. 24, No. 11, Nov. 2016, pp. 2187-2199.

Mahendran, A., Vedaldi, A., et al., "Understanding Deep Image Representations by Inverting Them," Nov. 26, 2014, pp. 1-9.

Mahendran, A., Vedaldi, A., et al., "Understanding Deep Image Representations by Inverting Them," The IEEE Conference on Computer Vision and Pattern Recognition (CVPR), 2015, pp. 5188-5196.

Milner, B., and Shao, X., "Speech Reconstruction From Mel-Frequency Cepstral Coefficients Using a Source-Filter Model," 7th International Conference on Spoken Language Processing [ICSLP2002], Colorado, USA, Sep. 16-20, 2002, 4 pages.

Mordvintsev, A., et al., "DeepDream—a code example for visualizing Neural Networks," Jul. 1, 2015, 2 pages.

Morgan, N., and Bourlard, H., "An introduction to Hybrid HMM/Connectionist continuous speech recognition," IEEE Signal Processing Magazine, May 1995, pp. 1-40.

Oord, A., et al., "Wavenet: A Generative Model for Raw Audio," Sep. 19, 2016, pp. 1-15.

Průša, Z., et al., "A Non-iterative Method for (Re)Construction of Phase from STFT Magnitude," IEEE/ACM Transactions on Audio, Speech, and Language Processing, Sep. 1, 2016, pp. 1-10.

Rabiner, R.L., "A Tutorial on Hidden Markov Models and Selected Applications in Speech Recognition," Proceedings of the IEEE, vol. 77, No. 2, Feb. 1989, pp. 257-286.

* cited by examiner

ELECTRONIC DEVICE, METHOD AND COMPUTER PROGRAM

CROSS-REFERENCE TO RELATED APPLICATION

The present application is claims priority to EP 19166137.0, filed Mar. 29, 2019, the entire contents of which are incorporated herein by reference.

TECHNICAL FIELD

The present disclosure generally pertains to the field of audio processing, in particular to devices, methods and computer programs for transcript based voice enhancement.

TECHNICAL BACKGROUND

Generally, audio processing systems are used not only for professional video and sound content production purposes but also for non-professional video and sound content production purposes.

Typically, for a high quality voice recording, for high voice intelligibility and voice enhancement of an audio content using voice transcript, perfect recording conditions are required, such as professional recording equipment, indoor recording, etc.

Although there exist techniques for audio processing, it is generally desirable to improve devices and methods for audio processing.

SUMMARY

According to a first aspect, the disclosure provides an electronic device comprising circuitry configured to perform a transcript based voice enhancement based on a transcript to obtain an enhanced audio signal.

According to a second aspect, the disclosure provides a method comprising performing a transcript based voice enhancement based on a transcript to obtain an enhanced audio signal.

According to a third aspect, the disclosure provides a computer program comprising instructions, the instructions when executed on a processor causing the processor to perform a transcript based voice enhancement based on a transcript to obtain an enhanced audio signal.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
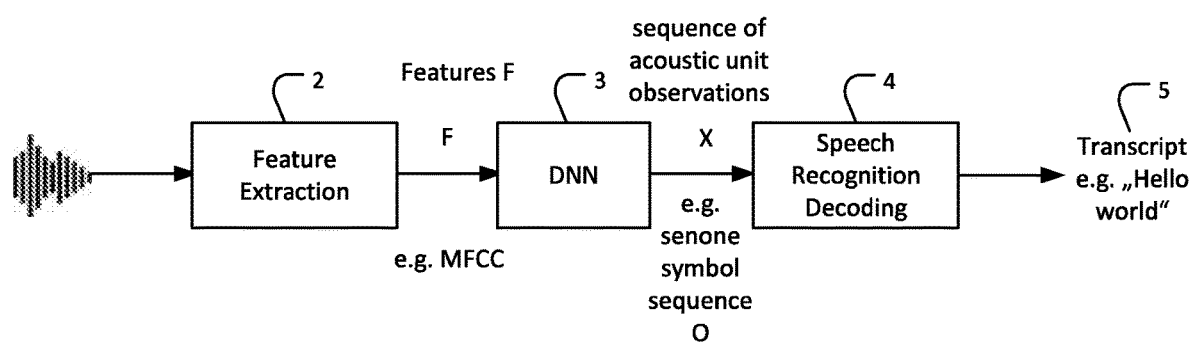
FIG. 1 illustrates a process of Automatic Speech Recognition (ASR) to obtain a word-level transcription of speech.

Before a detailed description of the embodiments under reference of FIG. 1 to FIG. 13, general explanations are made.

The embodiments disclose an electronic device comprising circuitry configured to perform a transcript based voice enhancement based on a transcript to obtain an enhanced audio signal.

The circuitry of the electronic device may include a processor, may for example be CPU, a memory (RAM, ROM or the like), a memory and/or storage, interfaces, etc. Circuitry may comprise or may be connected with input means (mouse, keyboard, camera, etc.), output means (display (e.g. liquid crystal, (organic) light emitting diode, etc.)), loudspeakers, etc., a (wireless) interface, etc., as it is generally known for electronic devices (computers, smartphones, etc.).

The input signal can be an audio signal of any type. It can be in the form of analog signals, digital signals, it can origin from a voice recorder, a compact disk, digital video disk, or the like, it can be a data file, such as a wave file, mp3-file or the like, and the present disclosure is not limited to a specific format of the input audio content. An input audio content may for example be a stereo audio signal having a first channel input audio signal and a second channel input audio signal, without that the present disclosure is limited to input audio contents with two audio channels.

In some embodiments, the circuitry may be configured to obtain the transcript of the audio input signal from an audio input signal by Speech Recognition Decoding.

In some embodiments, the circuitry is configured to generate features of an enhanced audio signal based on the transcript.

In some embodiments, the circuitry may be configured to perform forced alignment on a transcript of the audio input signal to obtain an ideal sequence of acoustic unit observations, perform gradient descent on the ideal sequence of acoustic unit observations to obtain the features and perform vocoding based on the obtained features to produce an audio signal.

A transcript may be a transcript received from any kind of transcription system, such as a word level transcription system or the like. For example as a transcript may be considered a most probable sequence of words, or the like. A word-level transcription may be obtained through an Automatic Speech Recognition (ASR) system, from a direct transcription from the user, such as typing the words, or the like. A user may for example provide a transcript in the form of a computer-readable format, e.g. a text file comprising a sequence of written words as ASCII or UTF8 data, or the like.

The ideal sequence of acoustic unit observations that is obtained by forced alignment performed on the transcript of the audio input signal may be an ideal sequence of senone symbols. For example, a senone symbol sequence may represent a vector of acoustic unit observations, or the like. The senone symbol sequence may be translated into a sequence of words. A speech signal may for example be divided into very small segments. These segments are then classified into a set of different types, each corresponding to a new symbol in a vocabulary called the senone vocabulary.

The gradient descent performed on the ideal sequence of acoustic unit observations to obtain the features may reverse the translation of input to output in a Deep Neural Network. The gradient descent may be a first-order iterative optimization algorithm for finding the minimum of a function, or any other algorithm that can be used for obtaining the minimum of a function, or the like.

In some embodiments, the features may be enhanced Mel-scale cepstral coefficients. In sound processing, a Mel-frequency cepstrum may be for example a representation of the short-term power spectrum of a sound, based on a linear cosine transform of a log power spectrum on a nonlinear Mel scale of frequency, or the like. The Mel-frequency cepstral coefficients may be coefficients that may be derived from a type of cepstral representation of an audio signal.

In some embodiments, performing vocoding may comprise resynthesizing the audio signal from the features. The vocoding may be a reverse of a feature extraction process for obtaining an enhanced audio signal. The vocoding for example may comprise resynthesizing an enhanced audio signal from the obtained enhanced Mel-scale cepstral coefficients.

In some embodiments, performing forced alignment may comprise performing an inverse Speech Recognition Decoding. At Speech Recognition Decoding, the senone symbol sequence, which may be a vector of acoustic unit observations, may be translated into a sequence of words for example by evaluating the probability of a possible sequences of words in a dynamic programming framework.

In some embodiments, the audio signal may be an enhanced version of the audio input signal.

In some embodiments, performing gradient descent may comprise computing a gradient of a loss function. A loss function may be any loss function considered as appropriate by the skilled person, for example the Mean Squared Error, or the like.

In some embodiments, the loss function may represent an error between the ideal sequence of acoustic unit observations as obtained from forced alignment, and a predicted sequence of acoustic unit observations as obtained from propagating a feature vector through a neural network.

In some embodiments, performing gradient descent may comprise multiplying the gradient of the loss with a predefined multiplication factor. The factor $\eta$ may be set to a predefined value, for example with a slider in the user interface, or the like. For example, a small $\eta$ may produce an audio signal close to the audio input signal, namely an original audio and a larger $\eta$ may produce a signal toward the ideal input signal to produce the expected transcript.

In some embodiments, the circuitry may be further configured to obtain the transcript of the audio input signal from an audio input signal by Speech Recognition Decoding.

In some embodiments, the circuitry may be further configured to perform feature extraction on the audio input signal to obtain coefficients. These coefficients may for example be Mel-scale cepstral coefficients.

In some embodiments, the circuitry may be further configured to perform Deep Neural Network processing based on the coefficients to obtain a sequence of acoustic unit observations. Deep Neural Network may be for example a WaveNet that is a type of feedforward neural network known as a deep convolutional neural network (CNN). In Deep Neural Network, neurons may be organized in layers. Different layers may perform different kinds of transformations on their inputs. The network may move through the layers calculating the probability of each output.

In some embodiments, the circuitry may be further configured to perform Speech Recognition Decoding on the sequence of acoustic unit observations based on a language model to obtain the transcript of the audio input signal.

In some embodiments, performing Speech Recognition Decoding may comprise performing maximum likelihood wherein performing maximum likelihood includes performing optimization by combining acoustic likelihoods and language model probabilities.

In some embodiments, the transcript is obtained by direct transcription from a user.

In some embodiments, the circuitry may be configured to perform a Deep Neural Network on a transcript of the audio input signal to obtain features and to perform vocoding based on the obtained features to produce an audio signal.

For example, the neural networks may output recognized words one after the other, such as no decoder is required and the gradient may be computed directly from word output targets.

In some embodiments, the features may be speaker- or channel-dependent features.

The embodiments also disclose a method comprising performing a transcript based voice enhancement based on a transcript to obtain an enhanced audio signal.

In some embodiments, the method may comprise performing forced alignment on a transcript of the audio input signal to obtain an ideal sequence of acoustic unit observations, performing gradient descent on the ideal sequence of acoustic unit observations to obtain the features and performing vocoding based on the obtained features to produce an audio signal.

According to a further aspect, the disclosure provides a computer program comprising instructions, the instructions when executed on a processor causing the processor to perform a transcript based voice enhancement based on a transcript to obtain an enhanced audio signal.

In some embodiments, the computer program comprising instructions, the instructions when executed on a processor may cause the processor to perform forced alignment on a transcript of the audio input signal to obtain an ideal sequence of acoustic unit observations, perform gradient descent on the ideal sequence of acoustic unit observations to obtain the features and perform vocoding based on the obtained features to produce an audio signal.

Embodiments are now described by reference to the drawings.

FIG. 1 illustrates a process of Automatic Speech Recognition (ASR) to obtain a word-level transcription of speech. A feature extraction is performed on an audio input signal (comprising speech) to extract characteristic features (F) for speech recognition, in this example here Mel-scale filterbank cepstral coefficients (MFCC). An exemplifying process of the feature extraction 2 is described in more detail under the reference of FIG. 2 bellow. The Mel-scale filterbank cepstral coefficients (MMFCs) are transmitted to a DNN 3. The DNN 3 translates the Mel-scale filterbank cepstral coefficients (MMFCs) to a senone symbol sequence which represents a vector of acoustic unit observations. The DNN 3 is described in more detail under reference of FIG. 3 below. The senone symbol sequence output by the DNN 3 is transmitted to a Speech Recognition Decoding 4. At the Speech Recognition Decoding 4, the senone symbol sequence (vector of acoustic unit observations) is translated into a sequence of words (in FIG. 1 represented by "Hello world") by evaluating the probability of the possible sequences of words in a dynamic programming framework. An exemplifying process of the Speech Recognition Decoding 4 is described in more detail under the reference of FIG. 6 bellow. The sequence of words obtained by this process of Automatic Speech Recognition (ASR) can be seen as a world-level transcript of the audio signal input to the process.

Figure 2:
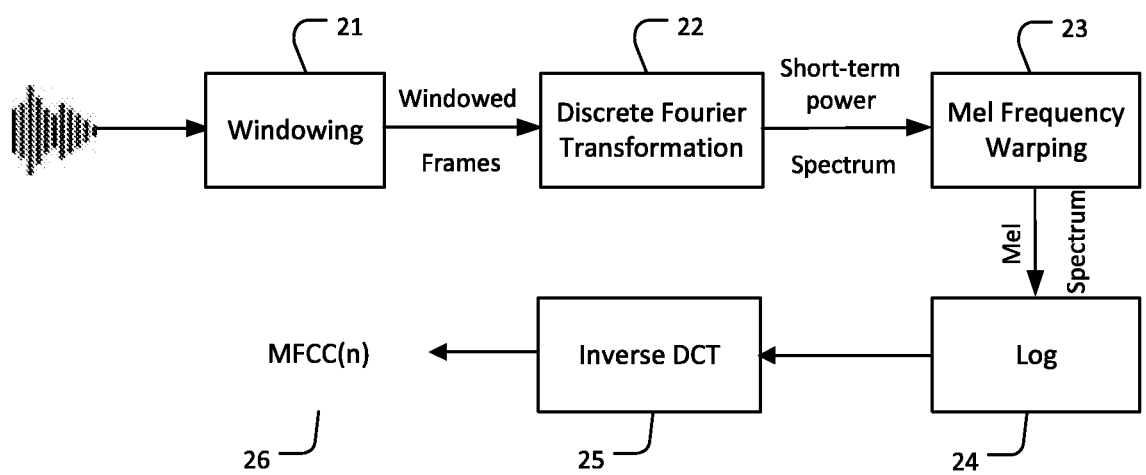
FIG. 2 schematically shows a process of determining Mel-scale filterbank cepstral coefficients (MFCCs) from an audio input signal.

FIG. 2 schematically shows a process of determining Mel-scale filterbank cepstral coefficients (MFCCs) from an audio input signal. The Mel-scale filterbank cepstral coefficients (MFCCs) are examples of characteristic features as extracted by the feature extraction 2 in FIG. 1. Windowing 21 is performed on an audio input signal, which is for example a continuous speech signal to obtain windowed frames. The windowed frames typically overlap, for example, having an overlapping rate of eg. 50%. At the discrete Fourier transformation 22, each windowed frame is converted into a respective short-term power spectrum. A Mel frequency warping 2 is applied on each short-term power spectrum to obtain, for each windowed frame, a respective Mel spectrum. Each Mel-spectrum is transmitted to a logarithmic function (Log) 24 to obtain a respective Log Mel-spectrum for each windowed frame. Each Log Mel-spectrum is transmitted to an inverse discrete Cosine transformation (DCT) 25 to obtain Mel-scale filterbank cepstral coefficients MFCC(n) for each windowed frame. Here, index n, indicates the windowed frame and thus represents a time scale. The Mel-scale filterbank cepstral coefficients MFCC(n) obtained by this process represent characteristic features of the audio input signal in the windowed frame.

The Mel-scale filterbank cepstral coefficients MFCC(n) can be represented by $$MFCC(n) = C \log(M P(n)) \qquad \text{Eq. (1)}$$

where P(n) is the short-term power spectrum for a windowed frame n (around a respective time instant) as obtained by the Discrete Fourier Transformation (22 in FIG. 2), M is a matrix having filters of a Mel-filterbank as columns and representing the Mel Frequency Warping (23 in FIG. 2), and C is the inverse Discrete Cosine transform matrix as obtained by the Inverse DCT (25 in FIG. 2).

At the windowing 21, the windowed frames can be obtained by $$X_n(i) = x(i) h_n(i) \qquad \text{Eq. (2)}$$

where x(i) represents the discretized audio input signal (i representing the sample number and thus time) and $h_n(i)$ is a windowing function around time n (respectively sample n), like for example the hamming function, which is well-known to the skilled person.

At the discrete Fourier transformation 22, each windowed frame is converted into a respective short-term power spectrum. The short-term power spectrum P(n) as obtained at the Discrete Fourier transform (22 in FIG. 2), also known as power spectral density, may be obtained by $$|P_f(n)| = \left| \sum_{i=0}^{N-1} X_n(i) e^{-\frac{j2\pi fi}{N}} \right| \qquad \text{Eq. (3)}$$

where $X_n(i)$ is the signal in the windowed frame n as defined in Eq. 2 above, f are the frequencies in the frequency domain, $|P_f(n)|$ are the components of the short-term power spectrum P(n) and N is the numbers of samples in a windowed frame.

Determining the short-term power spectrum leads to a loss of phase information, which though does not cause any loss of information regarding the magnitude spectrum.

At the Mel frequency warping (23 in FIG. 2), a spectral analysis is performed based on a fixed resolution along a subjective frequency scale e.g. a Mel-frequency scale, which produces a Mel-spectrum. The Mel frequency warping quantizes the frequency axis of the spectrum into a reduced resolution. The Mel-spectrum, which can be obtained by transforming the power spectrum using a Mel-filterbank matrix, can be obtained by $$P_k(n) = \sum_{f=0}^{\frac{N}{2}-1} |P_f(n)| w_{kf} \qquad \text{Eq. (4)}$$

where $w_k$ represents the channels of the triangular Mel-filter, and N is the numbers of samples in a windowed frame, respectively the number of frequency components in the short-term power spectrum.

At the Log 24, a respective Log Mel-spectrum for each windowed frame is obtained by $$\log P_k \qquad \text{Eq. (5)}$$

At the inverse discrete Fourier transformation (DFT) 25, the Mel-scale filterbank cepstral coefficients MFCC(n) for each windowed frame n can be obtained by $$MFCC_i(n) = u_i \sum_{k=0}^{R-1} (\log P_k(n)) \cos\left( \frac{(2k+1)i\pi}{2R} \right) \qquad \text{Eq. (6)}$$

where R represents the number of Mel-spaced filterbank channels and $$u_i = \frac{1}{\sqrt{R}} \text{ for } i = 0; \text{ and } u_i = \frac{1}{\sqrt{2R}} \text{ for } i > 0.$$

Figure 3:
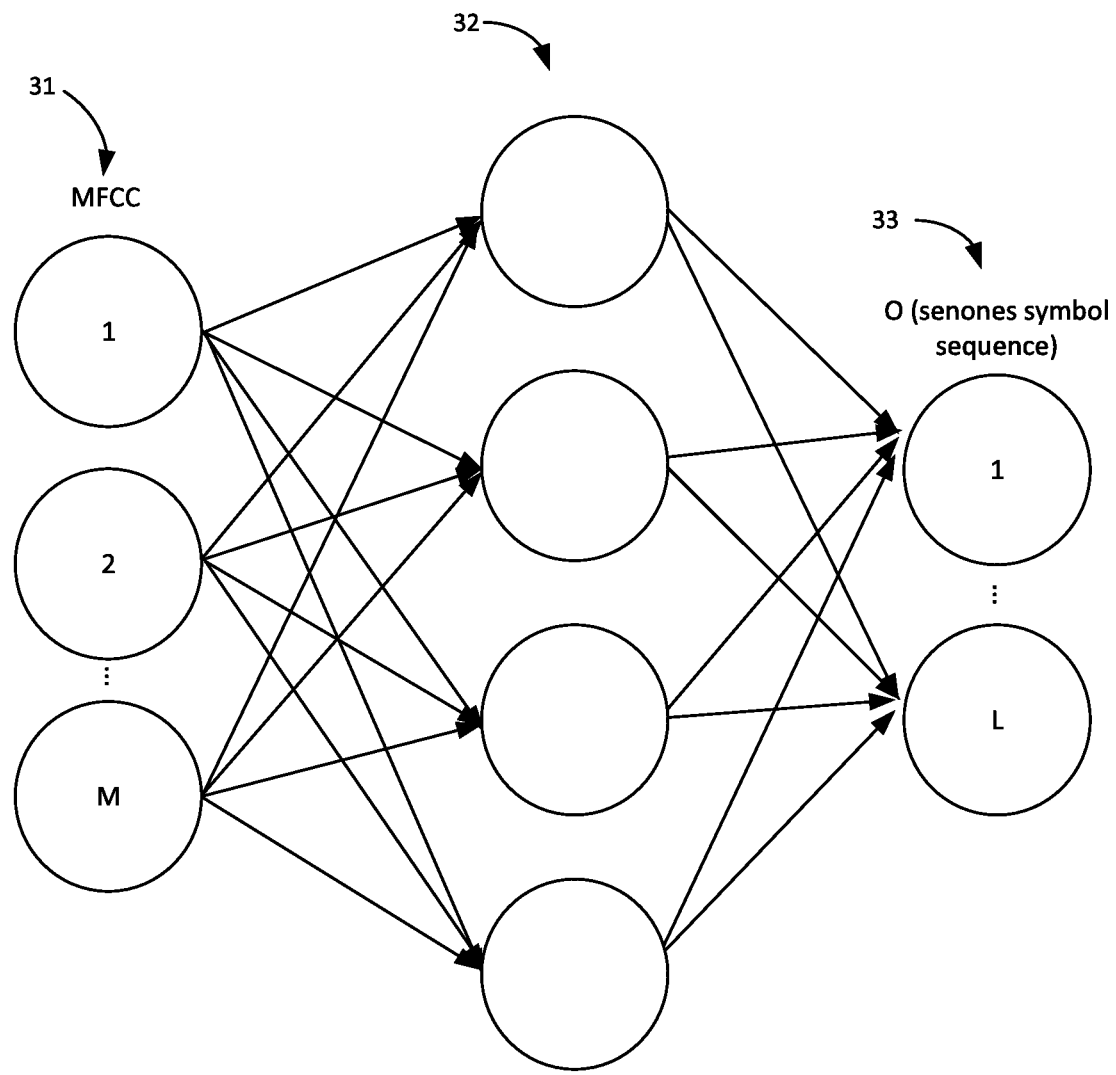
FIG. 3 schematically shows a process of a Deep Neural Network (DNN) 3 which translates characteristic features of the audio input signal, here for example Mel-scale filterbank cepstral coefficients MFCC(n) of a windowed frame, to acoustic unit observations, here a senone symbol sequence for the windowed frame.

FIG. 3 schematically shows a process of a Deep Neural Network (DNN) 3 which translates characteristic features of the audio input signal, here for example Mel-scale filterbank cepstral coefficients MFCC(n) of a windowed frame, to acoustic unit observations, here a senone symbol sequence for the windowed frame. The Deep Neural Network (DNN) comprises an input layer 31, a hidden layer 32 and an output layer 33. The input layer 31 includes a number of M neurons, each input neuron receiving a respective Mel-scale filterbank cepstral coefficient (MFCC) (see FIG. 4 for details) as obtained from feature extraction 2. The hidden layer 32 includes a predefined number of neurons, which are referred to as hidden neurons. The neurons of the hidden layer 32 receive inputs only from neurons of the input layer 31 and output to the neurons of the output layer 33. The output layer 33 includes neurons which represent acoustic unit observations X(m) (see FIG. 5 for details).

The Deep Neural Network (DNN) comprises connections (depicted as arrows in FIG. 3), each connection transferring the output of a neuron to the input of another neuron. Each connection is assigned a weight during a training phase. In this training phase, the Deep Neural Network (DNN) is trained, based on training data that is provided during the training phase, to translate Mel-scale filterbank cepstral coefficients MFCC(n) of a windowed frame to acoustic unit observations, here e.g. a senone symbol sequence for the windowed frame.

The weights obtained during training represent the strength of connections between the neurons. For simplicity, FIG. 3 shows only one hidden layer. There may, however be used multiple hidden layers.

The process of the Deep Neural Network (DNN) 3 comprises a so-called forward pass in which values of the output layers are obtained from the inputs data. The data is traversing through all neurons from the first (input) layer, through the hidden layer, to the last layer (output).

Figure 4:
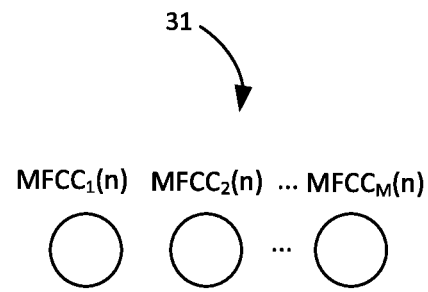
FIG. 4 schematically shows an example input layer 31 including neurons of the deep neural network of FIG. 3.

FIG. 4 schematically shows an example input layer 31 including neurons of the deep neural network of FIG. 3. The input layer 31 includes M neurons which receive respective Mel-scale filterbank cepstral coefficients MFCC(n) of a windowed frame n as obtained by the process described in FIG. 2 in more detail. The feature vectors MFCC(n) may be acoustic feature vectors of the audio input signal over a short period of time, e.g. over a window frame of a length of 20 milliseconds (ms). For each windowed frame n, the Mel-scale filterbank cepstral coefficients comprise coefficients $MFCC_1(n), \ldots, MFCC_M(n)$. Each coefficient $MFCC_{1 \ldots M}(n)$ can be represented by, e.g. a floating value which can be directly used as input of the respective neuron. The number M of coefficients can be arbitrarily chosen by the skilled person according to the specific needs. In general, the number of coefficients can be determined from experimental tests, knowing that too many coefficients will capture both the vocal tract (rapid variations) and glottal periodicities (slower variation) from the vocal chords after MFCC deconvolution. MFCC can be seen as a case of homomorphic filtering (deconvolving the vocal tract correlations and pitch/intonation correlations, which are convolved in the speech signal) where vocal tract and vocal chords variations are separated. Only the fastest variations are typically retained, that is, lowest order coefficients. (see linear prediction analysis of speech for this). According to an embodiment which is optimized for speech recognition/synthesis tasks, the coefficients, can typically chosen to be the first 13 to 40 coefficients, for the case of using a window of 20 ms (which corresponds to a typical senone symbol length) and a sampling rate of 16 kHz. That is, the MFCCs are truncated to avoid capturing the low-frequency glottal periodicities related to the glottal chords. The disclosure is however not limited to this example. The skilled person can also chose a lower or higher number of coefficients, other sampling rates and other window lengths than those given in the above example.

Figure 5:
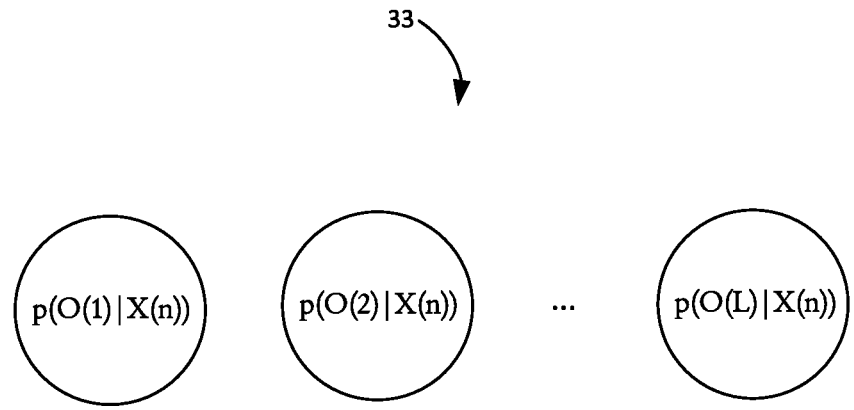
FIG. 5 schematically shows an example output layer 33 including neurons of the deep neural network of FIG. 3.

FIG. 5 schematically shows an example output layer 33 including neurons of the deep neural network of FIG. 3. The audio input signal in a windowed frame is aligned to an acoustic unit, here called "senone symbols". Each occurrence of a senone symbol represents an acoustic unit observation of duration 20 ms. Speech systems typically use a senone vocabulary size between L=1000 and L=50000. Each senone symbol is associated with a vector of the acoustic features, i.e. with an acoustic unit observation. In each 20 ms frame a senone class identifier (one out of L possible senones O(l)) is assigned. Several consecutive frames n might have the same senone assigned. Moreover, the frames typically overlap (eg. 50%). From 1 to 5 consecutive frames might be assigned to the same senone symbol. Hence, the senone duration may be for example, between 20 ms to 60 ms.

For each time instant n (respectively window frame n) the output layer 33 outputs posterior probabilities p(O(l)|X(n)) for the L possible senone symbols O(l). For a N-frame long input sequence, a N-frame long output sequence is obtained. Each output frame n contains L probabilities p(O(l)|X(n)) corresponding to the L possible senones O(l). The N-frame long output sequence of N senone symbol probability distributions p(O(l)|X(n)) (n=1, . . . , N) output from the DNN over time represents a senone symbol sequence.

The embodiments are, however, not limited to senone vectors, in particular not to the above exemplary number of 1000 to 50000 senone symbols. For example, in hybrid systems, the acoustic unit observations are a form of combination of phonemes in the language. For end-to-end systems these could be even words, in that case in tens or hundreds of thousands of acoustic unit observations. Examples of defining acoustic unit observations are for example given by N. Morgan and H. Bourlard in "An introduction to Hybrid HMM/Connectionist continuous speech recognition", IEEE Signal Processing Magazine (May 1995), pp. 25-42.

In this way, for an input vector sequence, the output layer of the deep neural network represents a senone symbol sequence O which is a vector of acoustic unit observations. The deep neural network has been trained to translate characteristic features of the audio input signal, here the Mel-scale filterbank cepstral coefficients MFCC(n) of a windowed frame, to acoustic unit observations, here the senone symbol sequence O for the windowed frame. Accordingly, the senone symbol sequence O obtained from the deep neural network matches the characteristic features of the audio input signal of the respective windowed frame of the input audio signal.

In the embodiment of FIG. 5, the acoustic unit observations are senone symbols which are small intervals of speech, here e.g. 20 ms. Alternatively, the acoustic unit observations may also be phonemes which are more abstract than senone symbols and which extend over a longer period of time, or any other symbols which may represent acoustic unit observations.

Figure 6:
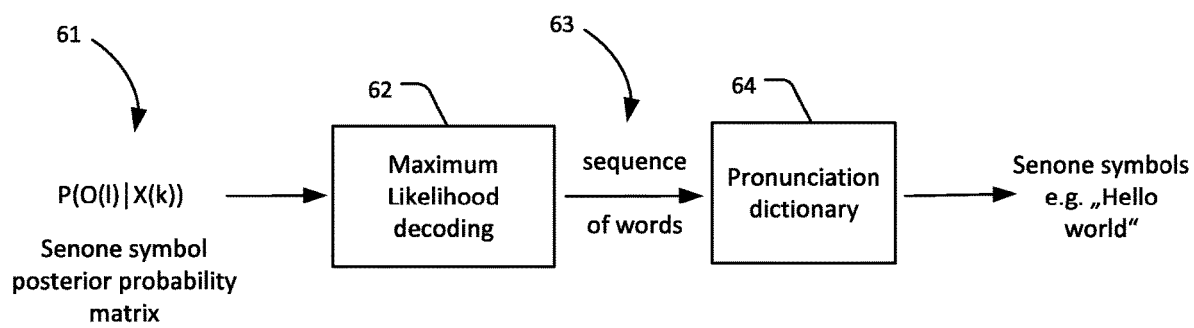
FIG. 6 schematically shows an embodiment of the Speech Recognition Decoding 4.

FIG. 6 schematically shows an embodiment of the Speech Recognition Decoding 4. The process comprises a senone symbol posterior probability matrix 61 e.g. p(O(l)|X(n)), a maximum likelihood decoding process 62 and a sequence of words 63 that have been translated into senone symbols via a pronunciation dictionary 64, e.g. "Hello world". The senone symbol probability matrix 61, being the output of the DNN 3 process (see FIG. 3 and FIG. 5) is transmitted to the maximum likelihood 62. The maximum likelihood decoding process 62 finds the sequences of words that best match the acoustic unit observations p(O(l)|X(n)) by evaluating all possible senone symbol transitions over the time axis of the matrix (see FIG. 3 and FIG. 5), here the senone symbol sequence as described in FIG. 5. The maximum likelihood decoding process 62 retrieves the maximum probability of word sequences based on a Hidden Markov Model (HMM)

and given the acoustic unit observations X, which after applying the Bayes theorem may be given by $$W_{opt} = \arg\max_{W} P(W \mid X) = P(X \mid W)P(W) = P(X \mid O)P(O) \quad \text{Eq. (7)}$$

where $W_{opt}$ is the probability of the most probable sequence of words that matches the acoustic unit observations X, and W and O represent the sequences of words and senone symbol sequence to be respectively tested during decoding. Here any word sequence can be translated into a phoneme sequence P or a senone symbol sequence O by means of a pronunciation dictionary. This optimization is performed by exploring a feasible subspace for W, or equivalently, for O while acoustic likelihoods P(X|O)=P(O|X)/P(O) and language model probabilities P(W), or equivalently, P(O) are combined. A typical stochastic language model has been proposed by R. Kneser, H. Ney, ICASSP 1995, in "Improved backing-off for M-gram language modeling". The language model provides context to distinguish between words and phrases that sound similar. The ambiguities are easier to resolve when evidence from the language model is incorporated with the pronunciation model and the acoustic model. As language models are trained on larger and larger texts, the number of unique words (the vocabulary) increases and the number of possible sequences of words increases exponentially with the size of the vocabulary.

Figure 7:
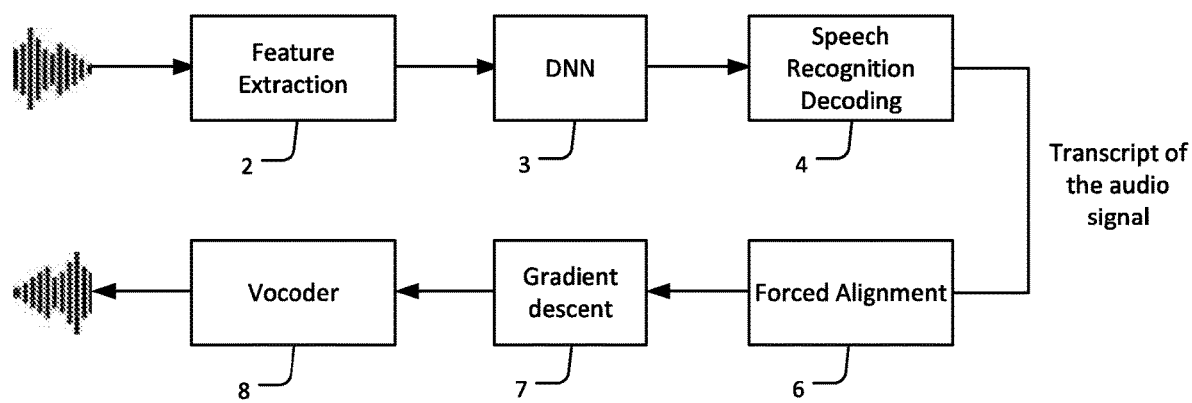
FIG. 7 illustrates an embodiment of transcript based voice enhancement.

FIG. 7 illustrates an embodiment of transcript based voice enhancement. As described in detail in FIG. 1, feature extraction 2 extracts essential features for speech recognition, here Mel-scale filterbank cepstral coefficients (MFCC), from an audio input signal (input speech). At DNN 3, the MFCC coefficients are translated into a sequence of acoustic unit observations (posterior probabilities p(O(l)|X(n))), here a sequence of senone symbol probability distributions. As described in FIG. 5 above, DNN 3 outputs a senone symbol probability distribution for each time instant n (respectively window frame n). An N-frame long output sequence of N senone symbol probability distributions p(O(l)|X(n)) (n=1, ..., N) collected from DNN 3 over time is transmitted to Speech Recognition Decoding 4. Speech Recognition Decoding 4 may for example be executed on chunks of speech data of length of 20 s for example which is of the magnitude of a typical length of a sentence. Assuming window frames of length 20 ms, 1000 senone symbols are obtained per chunk of speech data which are fed to Speech Recognition Decoding 4. Speech Recognition Decoding 4 is performed, based on a language model, on the sequence of acoustic unit observations (sequence of senone symbols) to obtain a most probable sequence of words which can be considered as a transcript of the audio input signal. Subsequently, a forced alignment 6 is performed on the transcript to obtain an ideal sequence of acoustic unit observations (sequence of senone symbols) which can be considered as an ideal output of the DNN. This forced alignment 6 reverses the Speech Recognition Decoding 4. Forced alignment 6 maps the transcript to an N-frame long sequence of senone symbol sequence $X_{ideal}(n)$ (n=1, ..., N) and provides it to the gradient descent 7. A gradient descent 7 is performed on the ideal sequence of acoustic unit observations (sequence of senone symbols) to obtain enhanced MFCC coefficients. This gradient descent 7 reverses the translation of input to output in DNN 3. A vocoder 8 resynthesizes an enhanced audio signal from the enhanced MFCC coefficients. This vocoding reverses the feature extraction 2. The enhanced audio signal obtained by the vocoding is an enhanced version of the audio input signal.

Figure 8:
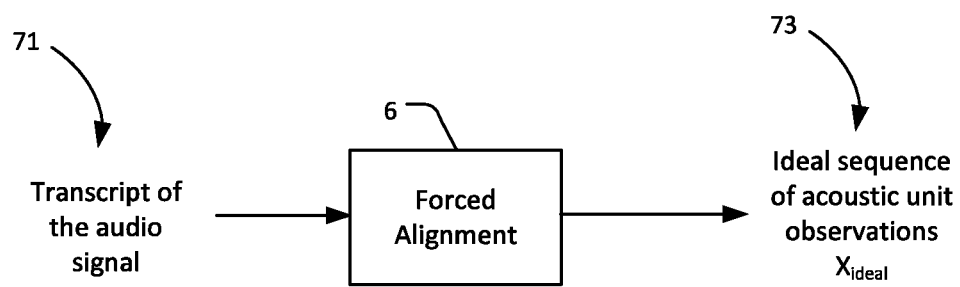
FIG. 8 describes an embodiment of the forced alignment (6 in FIG. 7)

FIG. 8 describes an embodiment of the forced alignment (6 in FIG. 7). Forced alignment 6 is performed on the transcript of the audio input signal to obtain an ideal sequence of acoustic unit observations $X_{ideal}(n)$ (n=1, ..., N) (sequence of senone symbols) which can be considered as an ideal output of the DNN for windowed frames n=1, ..., N. This forced alignment 6 reverses the speech recognition decoding (4 in FIG. 7). The forced alignment 6 aims at converting word-level alignments, which are assumed to be known, to phone-in-context unit alignments whose probabilities are output by the DNN 3. Forced-alignment 6 may involve a thorough evaluation of the likelihood of a sequence of input observations against the forced sequence of speech units. As the complexity grows exponentially in the number of input-output assignment sequences to be evaluated, the Viterbi algorithm and variants are typically used to make it in polynomial type (by evaluating new sequences in terms of already evaluated subsequences) as proposed by L. R. Rabiner in section B. Solution to Problem 2 of "A tutorial on Hidden Markov Models and Selected Applications in Speech Recognition", Readings in Speech Recognition, Pages 267-296, Morgan Kaufmann Publishers.

Figure 9:
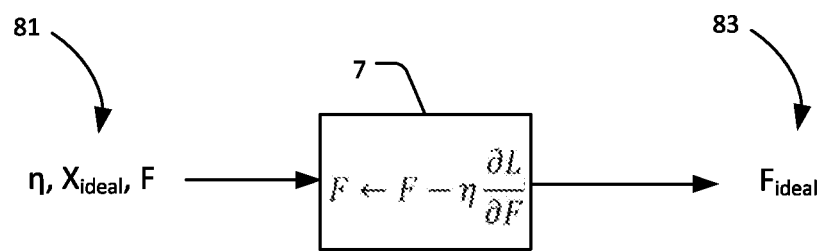
FIG. 9 describes an embodiment of the gradient descent (7 in FIG. 7)

FIG. 9 describes an embodiment of the gradient descent (7 in FIG. 7). This gradient descent 7 reverses the Deep Neural Network (3 in FIG. 7).

A gradient of the loss (with the ideal output of the DNN 3) with respect to the input $\partial \mathcal{L}/\partial F$ is computed. The gradient descent points out in which direction of the feature space, the features F, here MFCC coefficients should change to generate the transcript based on an ideal input. Based on the gradient $\partial \mathcal{L}/\partial F$ of a loss function $\mathcal{L}$ the input to the vocoder 8 is modified by a factor, which is η times the gradient $\partial \mathcal{L}/\partial F$ (gradient update):

$$F \leftarrow F - \eta \frac{\partial \mathcal{L}}{\partial F} \quad \text{Eq. (8)}$$

That is, at the gradient descent 7, a gradient of the loss is computed to output updated features F (here e.g. Mel-scale cepstral coefficients MFCC), which is the input to the vocoder 8 namely the inverse feature extraction 2.

The result of the gradient descent is an enhanced version $F_{enhanced}$ of the feature vector F with which the gradient descent started.

This gradient descent may for example start with the feature vector F obtained by the feature extraction (2 in FIG. 1) from the audio input signal. Alternatively, the feature vector F with which the gradient descent starts may be obtained by back propagation of the ideal sequence of acoustic unit observation $X_{ideal}(n)$ (n=1, ..., N) through the DNN 3.

For example, several steps of gradient update (a forward pass and a backward pass) may be applied iteratively. In such a case, the process includes so-called back propagation. For example, a first stage may involve initializing the parameters, for example randomly or using another initialization technique. Then a so-called forward pass and a backward pass of the whole DNN may be iteratively applied. A gradient or derivative of an error function is derived and used to modify the parameters.

Furthermore, one of several steps of gradient update (a forward pass and a backward pass) may be applied. However, in such a case, it may be desirable to stop before convergence (before reaching a local minimum) in order not deviate too much from the audio input signal. The function to optimize is highly nonlinear, which means that, for example, with a small learning rate, the optimization may reach and stay in a very sharp local minimum while a large learning rate may escape this local minimum.

The learning rate and the number of update are some hyper-parameter to be set according the desired output (for example set by a slider that the user can modify). A larger learning and more update steps will lead to a more intelligible output but a smaller learning rate and less steps will lead to closer to original output.

Moreover, a regularization term may also be used during the gradient update. For example, an α-norm regularizer may be used by adding an α-norm term in the loss function, which may contribute to produce desirable results and suggest to set a to a large value (e.g. α=6) for images, as proposed in "Mahendran, Aravindh, and Andrea Vedaldi. "Understanding deep image representations by inverting them." *Proceedings of the IEEE conference on computer vision and pattern recognition*. 2015".

The factor η can be set to a predefined value (for example with a slider in the user interface). For example, a small η may produce an audio signal close to the audio input signal e.g. original audio and a larger η may produce a signal toward the ideal input signal to produce the expected transcript.

As loss function $\mathcal{L}$, any loss function considered as appropriate by the skilled person may be used, for example the Mean Squared Error between the ideal sequence of acoustic unit observations $X_{ideal}$ as obtained from forced alignment (6 in FIG. 7), and the predicted sequence of acoustic unit observations $X_{pred.}$ as obtained from propagating the feature vector F through the DNN 3:

$$\mathcal{L} = \frac{1}{KL}\sum_{l=1}^{L}\sum_{k=1}^{K}\left(X_{ideal}^{l}(k) - X_{pred.}^{l}(k)\right)^2 \qquad \text{Eq. (9)}$$

where $O_{ideal}$ is the ideal sequence of acoustic unit observations as obtained from forced alignment (6 in FIG. 7), where $O_{pred}$ is the sequence of acoustic unit observations as obtained from the propagating the feature vector F through the DNN 3, L is the number of unit observations (senone symbols) and K is the length of the sequence of unit observations (see FIG. 5).

Figure 10:
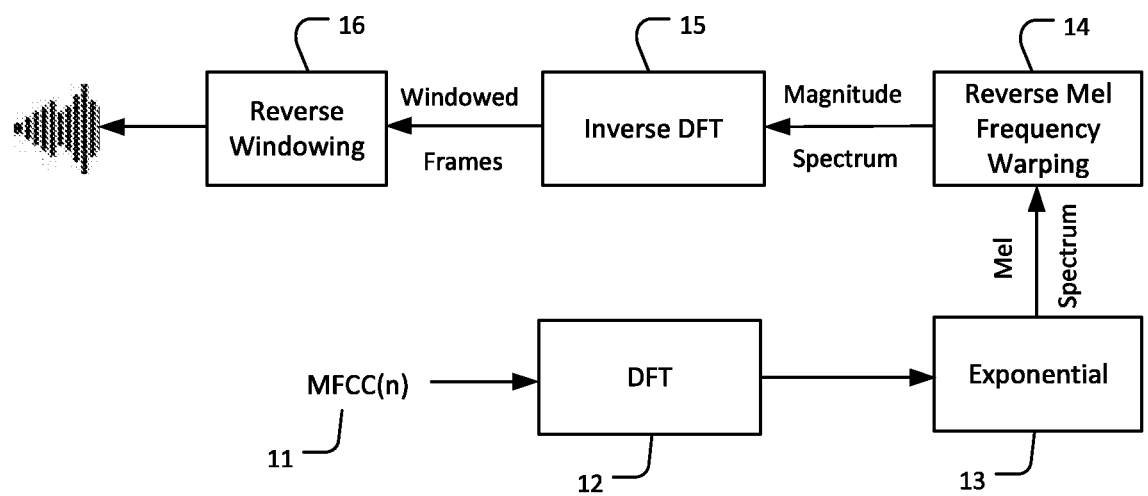
FIG. 10 describes an embodiment of the vocoder (8 in FIG. 7) which resynthesizes an enhanced audio signal from the enhanced feature vector $F_{enhanced}$, here e.g. from enhanced MFCC coefficients $MFCC_{enhanced}$.

FIG. 10 describes an embodiment of the vocoder (8 in FIG. 7) which resynthesizes an enhanced audio signal from the enhanced feature vector $F_{enhanced}$, here e.g. from enhanced MFCC coefficients $MFCC_{enhanced}$. This vocoding reverses the feature extraction 2. The enhanced Mel-scale cepstral coefficients $MFCC_{enhanced}$ of a windowed frame are input to a Discrete Fourier Transformation (DFT) 12.

At DFT 12, the ideal Mel-scale cepstral coefficients $MFCC_{ideal}$ for each windowed frame are converted into a respective ideal Mel-spectrum. Each ideal Mel-spectrum is input to an exponential function 13 to obtain a respective ideal exponential Mel-spectrum for each windowed frame. Each ideal Mel-spectrum is transmitted to the reverse Mel-frequency Warping 14 to obtain an ideal short-term power spectrum. An inverse DFT 15 (e.g. a Discrete Cosine transformation) converts each ideal short-term power spectrum to a respective enhanced windowed frame. A reverse windowing 16 resynthesizes an enhanced audio signal based on the enhanced windowed frames, which is an enhanced version of the audio input signal (as input to feature extraction 2 in FIG. 7).

At DFT 12, the ideal Mel-scale cepstral coefficients $MFCC_{ideal}$ are converted into a an enhanced log Mel-spectrum, which is obtained by $$\log P_{k,enhanced}(n) = \sum_{i=0}^{R-1} u_i MFCC_i(n)\cos\left(\frac{(2k+1)i\pi}{2R}\right) \qquad \text{Eq. (10)}$$

where R represents the number of the Mel-spaced filterbank channels and $$u_i = \frac{1}{\sqrt{R}}, i = 0; u_i = \frac{1}{\sqrt{2R}}, i > 0.$$

Eq. (10) reverses Eq. (6) which implements the inverse discrete Fourier transformation (DFT) 25 in FIG. 2.

The enhanced log Mel-spectrum $\log P_{k,enhanced}(n)$ is input to the exponential 13 to obtain a respective enhanced Mel-spectrum $P_{k,enhanced}(n)$ for each windowed frame n, which can be obtained by using the exponential operator.

At the reverse Mel-frequency Warping 14, an ideal short-term power spectrum, which is a magnitude spectrum, can obtained by using interpolation, as the number of MFCC components M, is larger than the number R of Mel-spaced filterbank channels. As described by Ben Milner and Xu Shao in "Speech Reconstruction From Mel-Frequency Cepstral Coefficients Using a Source-Filter Model", an inverse DCT can be used for example to perform the interpolation. This can be achieved by taking a high resolution IDCT to transform the truncated MFCC coefficients into the log filterbank domain. This may lead to a fine Mel-scale resolution from which the linearly spaced spectral frames could be estimated to recreate the M dimensional magnitude spectrum.

As discussed above, determining the short-term power spectrum leads to a loss of phase information, which though does not cause any loss of information regarding the magnitude spectrum. However, phase information reconstruction is possible as described by D. Griffin and J. Lim, "Signal estimation from modified short-time Fourier transform, in "Acoustics, Speech and SignalProcessing", IEEE Transactions on, vol. 32, no. 2, pp. 236-243, 1984 and by Zdenek Pruia, Peter Balazs, Peter Lempel Sondergaard in "A Noniterative Method for Reconstruction of Phase From STFT Magnitude", IEEE transactions on ASLP, vol. 25, no. 5, May 2017. In particular, algorithms, for example, like Griffin-Lim, are used to reconstruct the phase information from DFT coefficients taken directly from the Mel-spectrum obtained after inverse DCT of the MFCC coefficients.

The Griffin-Lim algorithm implements an inverse DFT 15 and directly gives the time domain signal from the amplitude information contained in the M magnitude spectrum as obtained reverse Mel-frequency Warping 14. The Griffin-Lim algorithm iteratively transforms from Fourier domain to time domain and back to Fourier domain. The process is repeated many times. The process is stopped in time domain, in order to obtain the time domain signal which represents the windowed frames. That is, for each windowed frame, the inverse DFT 15 converts the respective enhanced short-term power spectrum to a respective enhanced windowed frame.

The reverse windowing 16 resynthesizes an enhanced audio signal from the windowed frames (e.g. by concatenating the respective enhanced windowed frames, taking into account potential overlap of the frames), the enhanced audio signal being an enhanced version of the audio input signal.

The process of transcript based voice enhancement is not limited to the one described above with regard to FIG. 7. Alternatively, a Deep Neural Network, similar to WaveNet, conditioned on original features and transcript may be used. Such a network may be trained to enhance speech with noisy audio and transcript as input and clean audio as output e.g. audio without noise.

Figure 11:
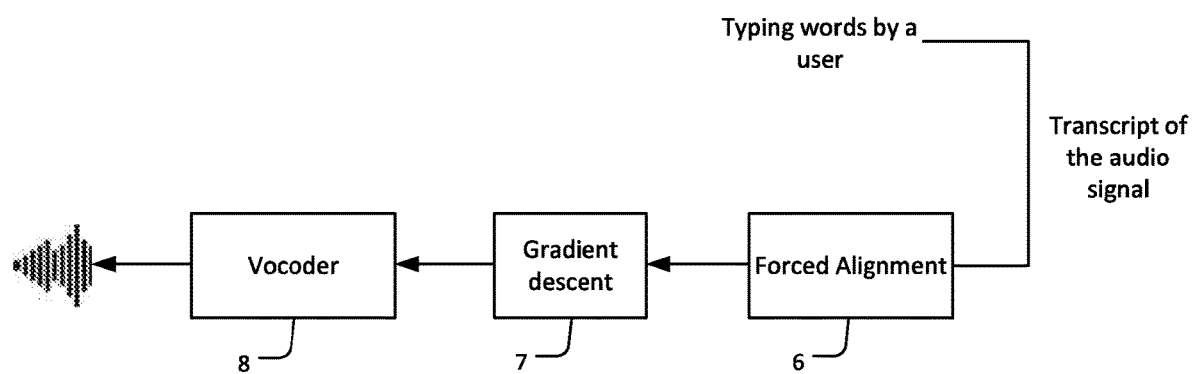
FIG. 11 illustrates an embodiment of transcript based voice enhancement, wherein the transcript obtained by direct transcription from a user.

FIG. 11 illustrates an embodiment of transcript based voice enhancement, wherein the transcript obtained by direct transcription from a user. As already discussed in FIG. 7, a word-level transcription can be obtained through an Automatic Speech Recognition (ASR) system. Alternatively, a word-level transcription can be obtained by direct transcription from a user namely by typing the words to a user interface, keyboard or the like. Subsequently, a forced alignment 6 is performed on the transcript to obtain an ideal sequence of acoustic unit observations (sequence of senone symbols). This forced alignment 6 reverses the Speech Recognition Decoding 4. A gradient descent 7 is performed on the ideal sequence of acoustic unit observations (sequence of senone symbols) to obtain MFCC coefficients. A vocoder 8 resynthesizes an ideal audio signal from the MFCC coefficients. The ideal audio signal, obtained by the vocoding, is an enhanced version of the audio input signal.

Figure 12:
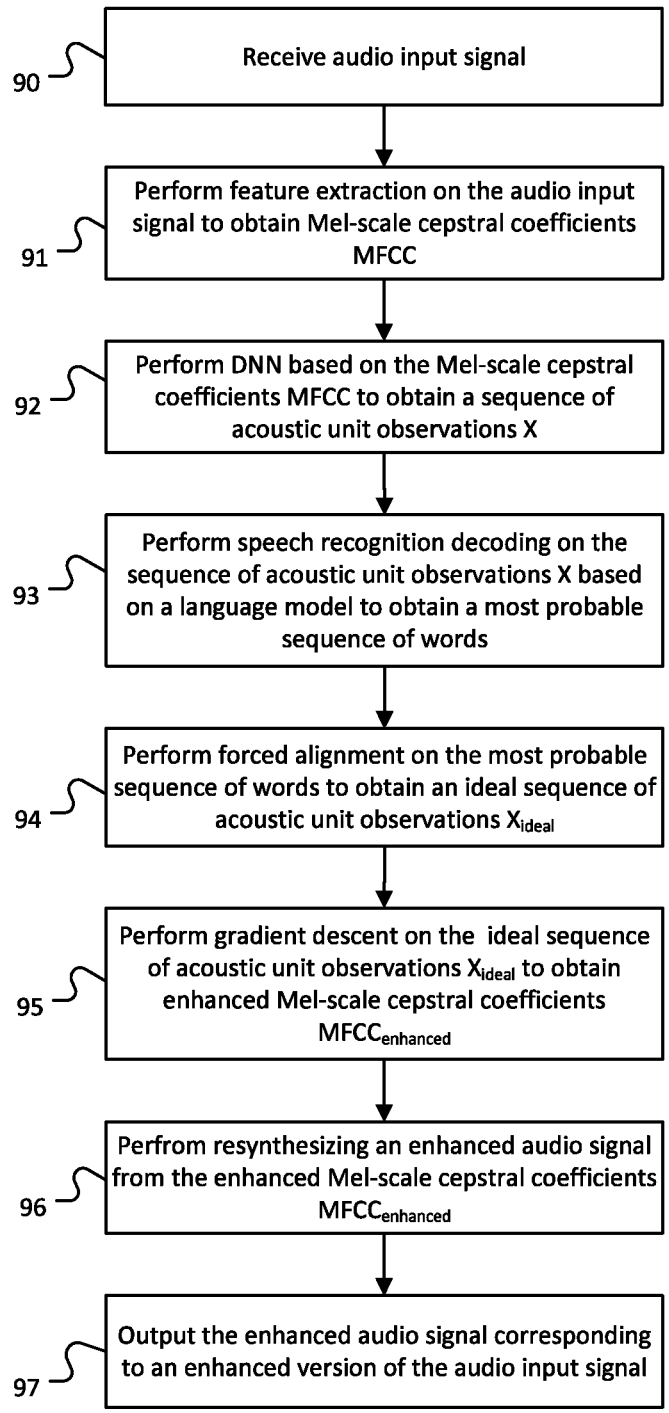
FIG. 12 shows a flow diagram visualizing a method for an embodiment of transcript based voice enhancement.

FIG. 12 shows a flow diagram visualizing a method for a transcript based voice enhancement. At 90, the feature extraction 2 receives an audio input signal (see FIG. 1). At 91, feature extraction 2 is performed on the audio input signal to obtain Mel-scale cepstral coefficients MFCC (see FIG. 1, FIG. 2 and FIG. 7). At 92, deep neural network (DNN) 3 is performed based on the Mel-scale cepstral coefficients MFCC to obtain a sequence of acoustic unit observations X (see FIG. 1, FIG. 3 and FIG. 7). At 93, Speech Recognition Decoding 4 is performed on the sequence of acoustic unit observations X, here a sequence of senone symbol sequence, based on a language model to obtain a most probable sequence of words (see FIG. 1, FIG. 6 and FIG. 7). At 94, forced alignment 6 is performed on the most probable sequence of words to obtain an ideal sequence of acoustic unit observations $X_{ideal}$ (see FIG. 7 and FIG. 8). At 95, gradient descent 7 is performed on the ideal sequence of acoustic unit observations $X_{ideal}$ to obtain enhanced Mel-scale cepstral coefficients $MFCC_{enhanced}$ (see FIG. 7 and FIG. 9). At 96, a vocoder 8 resynthesizes an enhanced audio signal from the enhanced Mel-scale cepstral coefficients $MFCC_{enhanced}$ (see FIG. 7 and FIG. 10). At 97, the enhanced audio signal is output, which corresponds to an enhanced version of the audio input signal. The ideal audio signal may be output to a recorder configured to record audio signals directly for example to Youtube channel or the like, and/or for example to record and replace the ideal audio signal with the audio input signal, and/or for example to output the ideal signal to a loudspeaker array or the like.

Figure 13:
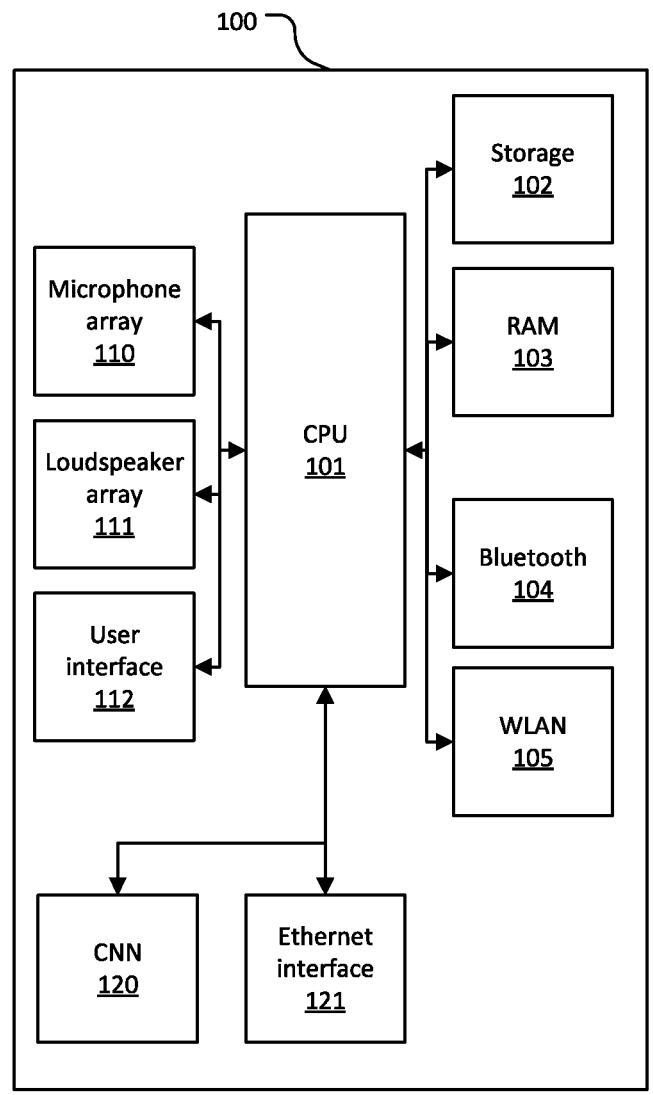
FIG. 13 schematically describes an embodiment of an electronic device that can implement the processes of reversing the automatic speech recognition toolchain.

FIG. 13 schematically describes an embodiment of an electronic device that can implement the transcript based voice enhancement, as described above. The electronic device 100 comprises a CPU 101 as processor. The electronic device 100 further comprises a microphone array 110, a loudspeaker array 111 and a convolutional neural network unit 120 that are connected to the processor 101. Processor 101 may for example implement a feature extraction 2, a Speech Recognition Decoding 4, a vocoder 8 and/or a forced alignment 6 that realize the processes described with regard to FIG. 1 and FIG. 7 in more detail. The CNN unit may for example be an artificial neural network in hardware, e.g. a neural network on GPUs or any other hardware specialized for the purpose of implementing an artificial neural network. The CNN unit may implement the process of a DNN 3 and gradient descent 7 as described with regard to FIG. 3 and FIG. 8. Loudspeaker array 111 consists of one or more loudspeakers that may be used to reproduce the enhanced audio signal obtained by the transcript based voice enhancement. The electronic device 100 further comprises a user interface 112 that is connected to the processor 101. This user interface 112 acts as a man-machine interface and enables a dialogue between an administrator and the electronic system. For example, an administrator may make configurations to the system using this user interface 112. The electronic device 100 further comprises an Ethernet interface 121, a Bluetooth interface 104, and a WLAN interface 105. These units 104, 105 act as I/O interfaces for data communication with external devices. For example, additional loudspeakers, microphones, and video cameras with Ethernet, WLAN or Bluetooth connection may be coupled to the processor 101 via these interfaces 121, 104, and 105. It should be noted that although the electronic device of FIG. 13 comprises a dedicated CNN unit, the CNN could alternatively also be implemented in the processor 101.

The electronic system 100 further comprises a data storage 102 and a data memory 103 (here a RAM). The data memory 103 is arranged to temporarily store or cache data or computer instructions for processing by the processor 101. The data storage 102 is arranged as a long term storage, e.g. for recording sensor data obtained from the microphone array 110 and provided to or retrieved from the CNN unit 120. The data storage 102 may also store audio data that represents audio messages, which the public announcement system may transport to people moving in the predefined space.

It should be noted that the description above is only an example configuration. Alternative configurations may be implemented with additional or other sensors, storage devices, interfaces, or the like.

In the embodiments described above, Mel-scale cepstral coefficients MFCC are used as audio features. However, the skilled person will readily appreciate that other audio features can be used. For example, linear frequency cepstral coefficients can be used instead, or even two parallel sets of features may be used, one for recognition and one for synthesis. MFCC are just an example of many possibilities. For example, speaker- or channel-dependent features such as i-vectors may be used as audio features. The i-vector may allow to keep separately the features related to the identity of the speaker (specific to the voice of the speaker). In such a case, the gradient update may be used on all other features but the i-vectors are kept untouched to preserve the original voice of the speaker.

It should be recognized that the embodiments describe methods with an exemplary ordering of method steps. The specific ordering of method steps is, however, given for illustrative purposes only and should not be construed as binding.

It should also be noted that the division of the electronic system of FIG. 13 into units is only made for illustration purposes and that the present disclosure is not limited to any specific division of functions in specific units. For instance, at least parts of the circuitry could be implemented by a respectively programmed processor, field programmable gate array (FPGA), dedicated circuits, and the like.

All units and entities described in this specification and claimed in the appended claims can, if not stated otherwise, be implemented as integrated circuit logic, for example, on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An electronic device comprising circuitry configured to perform a transcript based voice enhancement based on a transcript to obtain an enhanced audio signal.

(2) The electronic device of (1), wherein the circuitry is further configured to obtain the transcript of the audio input signal (x(t)) from an audio input signal (x(t)) by Speech Recognition Decoding (4).

(3) The electronic device of anyone of (1) to (2), wherein the transcript is obtained by direct transcription of a transcript provided from a user.

(4) The electronic device of (3), wherein the transcript is a sequence of written words provided by the user in a computer readable format.

(5) The electronic device of anyone of (1) to (4), wherein the circuitry is configured to generate features of an enhanced audio signal based on the transcript.

(6) The electronic device of anyone of (1) to (5), wherein the circuitry is configured to perform (94) forced alignment (6) on a transcript of the audio input signal (x(t)) to obtain an ideal sequence of acoustic unit observations ($X_{ideal}$).

(7) The electronic device of (6), wherein the circuitry is configured to perform (95) gradient descent (7) on the ideal sequence of acoustic unit observations ($X_{ideal}$) to obtain features (F).

(8) The electronic device of (7), wherein the circuitry is configured to perform (96) vocoding (8) based on the obtained features (F) to produce an audio signal.

(9) The electronic device of (7), wherein the features (F) are enhanced Mel-scale cepstral coefficients ($MFCC_{enhanced}$).

(10) The electronic device of (8), wherein performing vocoding (8) comprises resynthesizing the audio signal from the features (F).

(11) The electronic device of (6), wherein performing forced alignment (6) comprises performing an inverse Speech Recognition Decoding (4).

(12) The electronic device of (2), wherein the audio signal is an enhanced version of the audio input signal (x(t)).

(13) The electronic device of (7), wherein performing gradient descent (7) comprises computing a gradient $$\left(\frac{\partial \mathcal{L}}{\partial F}\right)$$

of a loss function $\mathcal{L}$.

(14) The electronic device of (13), wherein the loss function ($\mathcal{L}$) represents an error between the ideal sequence of acoustic unit observations ($X_{ideal}$) as obtained from forced alignment, and a predicted sequence of acoustic unit observations ($X_{pred.}$) as obtained from propagating a feature vector (F) through a neural network (3).

(15) The electronic device of (13), wherein performing gradient descent comprises multiplying the gradient $$\left(\frac{\partial \mathcal{L}}{\partial F}\right)$$

the loss with a predefined multiplication factor (p).

(16) The electronic device of (2), wherein the circuitry is further configured to perform (91) feature extraction (2) on the audio input signal (x(t)) to obtain coefficients (MFCC).

(17) The electronic device of (16), wherein the circuitry is further configured to perform (92) Deep Neural Network (3) processing based on the coefficients (MFCC) to obtain a sequence of acoustic unit observations (X).

(18) The electronic device of (17), wherein the circuitry is further configured to perform (93) Speech Recognition Decoding (4) on the sequence of acoustic unit observations (X) based on a language model to obtain the transcript of the audio input signal (x(t)).

(19) The electronic device of (18), wherein performing Speech Recognition Decoding (4) comprises performing maximum likelihood (62) wherein performing maximum likelihood (62) includes performing optimization by combining acoustic likelihoods and language model probabilities.

(20) The electronic device of anyone of (1) to (19), wherein the circuitry is configured to perform (94) a Deep Neural Network on a transcript of the audio input signal (x(t)) to obtain features (F), and to perform (96) vocoding (8) based on the obtained features (F) to produce an audio signal.

(21) The electronic device of (7), wherein the features (F) are speaker- or channel-dependent features.

(22) A method comprising performing a transcript based voice enhancement based on a transcript to obtain an enhanced audio signal.

(23) The method of (22), wherein the method comprising obtaining the transcript of the audio input signal (x(t)) from an audio input signal (x(t)) by Speech Recognition Decoding (4).

(24) The method of anyone of (22) to (23), wherein the method comprising obtaining the transcript by direct transcription of a transcript provided from a user.

(25) The method of (26), wherein the transcript is a sequence of written words provided by the user in a computer readable format.

(26) The method of anyone of (22) to (25), wherein the method comprising generating features of an enhanced audio signal based on the transcript.

(27) The method of (22) to (26), wherein the method comprising:
  performing (94) forced alignment (6) on a transcript of the audio input signal (x(t)) to obtain an ideal sequence of acoustic unit observations ($X_{ideal}$);
  performing (95) gradient descent (7) on the ideal sequence of acoustic unit observations ($O_{ideal}$) to obtain the features (F); and
  performing (96) vocoding (8) based on the obtained features (F) to produce an audio signal.

(28) The method of (27), wherein the features (F) are enhanced Mel-scale cepstral coefficients ($MFCC_{enhanced}$).

(29) The method of (27), wherein performing vocoding (8) comprises resynthesizing the audio signal from the features (F).

(30) The method of (27), wherein performing forced alignment (6) comprises performing an inverse Speech Recognition Decoding (4).

(31) The method of (23), wherein the audio signal is an enhanced version of the audio input signal (x(t)).

(32) The method of (27), wherein performing gradient descent (7) comprises computing a gradient $$\left(\frac{\partial \mathcal{L}}{\partial F}\right)$$

(of a loss function ($\mathcal{L}$).

(33) The method of (32), wherein the loss function ($\mathcal{L}$) represents an error between the ideal sequence of acoustic unit observations ($X_{ideal}$) as obtained from forced alignment, and a predicted sequence of acoustic unit observations ($X_{pred}$) as obtained from propagating a feature vector (F) through a neural network (3).

(34) The method of (32), wherein performing gradient descent comprises multiplying the gradient $$\left(\frac{\partial \mathcal{L}}{\partial F}\right)$$

of the loss with a predefined multiplication factor (i).

(35) The method of (23), wherein the method further comprising performing (91) feature extraction (2) on the audio input signal (x(t)) to obtain coefficients (MFCC).

(36) The method of (35), wherein the method further comprising performing (92) Deep Neural Network (3) processing based on the coefficients (MFCC) to obtain a sequence of acoustic unit observations (X).

(37) The method of (36), wherein the method further comprising performing (93) Speech Recognition Decoding (4) on the sequence of acoustic unit observations (O) based on a language model to obtain the transcript of the audio input signal (x(t)).

(38) The method of (37), wherein performing Speech Recognition Decoding (4) comprises performing maximum likelihood (62) wherein performing maximum likelihood (62) includes performing optimization by combining acoustic likelihoods and language model probabilities.

(39) The method of anyone of (22) to (38), wherein the method further comprising performing (94) a Deep Neural Network on a transcript of the audio input signal (x(t)) to obtain features (F), and to perform (96) vocoding (8) based on the obtained features (F) to produce an audio signal.

(40) The electronic device of (27), wherein the features (F) are speaker- or channel-dependent features.

(41) A computer program comprising instructions, the instructions when executed on a processor causing the processor to perform a transcript based voice enhancement based on a transcript to obtain an enhanced audio signal.

(42) The computer program of (42), wherein the computer program comprising instructions, the instructions when executed on a processor causing the processor to:
  perform (94) forced alignment (6) on a transcript of the audio input signal (x(t)) to obtain an ideal sequence of acoustic unit observations ($X_{ideal}$);
  perform (95) gradient descent (7) on the ideal sequence of acoustic unit observations ($X_{ideal}$) to obtain the features (F); and
  perform (96) vocoding (8) based on the obtained features (F) to produce an audio signal.

The invention claimed is:

1. An electronic device, comprising circuitry configured to:
  window an audio input signal to extract features from the audio input signal,
  generate a first senone symbol sequence by propagating the extracted features through a neural network,
  decoding the first senone symbol sequence to obtain a transcript of the audio input signal,
  perform forced alignment on the transcript to obtain a second senone symbol sequence,
  determine differences between the second senone symbol sequence and the first senone symbol sequence by computing a gradient of a loss function,
  modify the gradient of the loss function by multiplying the gradient of the loss function with a predefined multiplication factor,
  perform gradient descent based on the extracted features and the modified gradient of the loss function to generate enhanced features for the extracted features from the transcript of the audio input signal, and
  perform vocoding based on the enhanced features to produce an enhanced audio signal.

2. The electronic device of claim 1, wherein the circuitry is further configured to obtain the transcript of the audio input signal by Speech Recognition Decoding.

3. The electronic device of claim 2, wherein the enhanced audio signal is an enhanced version of the audio input signal.

4. The electronic device of claim 1, wherein the transcript is obtained by direct transcription of a transcript provided from a user.

5. The electronic device of claim 4, wherein the transcript is a sequence of written words provided by the user in a computer readable format.

6. The electronic device of claim 1, wherein the enhanced features are enhanced Mel-scale cepstral coefficients.

7. The electronic device of claim 1, wherein performing vocoding comprises resynthesizing the enhanced audio signal from the enhanced features.

8. The electronic device of claim 1, wherein performing forced alignment comprises performing an inverse Speech Recognition Decoding.

9. The electronic device of claim 1, wherein the neural network is a Deep Neural Network.

10. The electronic device of claim 9, wherein the circuitry is further configured to perform Speech Recognition Decoding on the first senone symbol sequence based on a language model to obtain the transcript of the audio input signal.

11. The electronic device of claim 10, wherein performing Speech Recognition Decoding comprises performing maximum likelihood wherein performing maximum likelihood includes performing optimization by combining acoustic likelihoods and language model probabilities.

12. The electronic device of claim 1, wherein the extracted features are speaker- or channel-dependent features.

13. A method, comprising:
  windowing an audio input signal to extract features from the audio input signal,
  generating a first senone symbol sequence by propagating the extracted features through a neural network, decoding the first senone symbol sequence to obtain a transcript of the audio input signal, performing forced alignment on the transcript to obtain a second senone symbol sequence, determining differences between the second senone symbol sequence and the first senone symbol sequence by computing a gradient of a loss function, modifying the gradient of the loss function by multiplying the gradient of the loss function with a predefined multiplication factor, performing gradient descent based on the extracted features and the modified gradient of the loss function to generate enhanced features for the extracted features from the transcript of the audio input signal, and performing vocoding based on the enhanced features to produce an enhanced audio signal.

14. A non-transitory computer readable storage device having a computer program comprising instructions that, when executed on a processor, causing the processor to:

window an audio input signal to extract features from the audio input signal, generate a first senone symbol sequence by propagating the extracted features through a neural network, decode the first senone symbol sequence to obtain a transcript of the audio input signal, perform forced alignment on the transcript to obtain a second senone symbol sequence, determine differences between the second senone symbol sequence and the first senone symbol sequence by computing a gradient of a loss function, modify the gradient of the loss function by multiplying the gradient of the loss function with a predefined multiplication factor, perform gradient descent based on the extracted features and the modified gradient of the loss function to generate enhanced features for the extracted features from the transcript of the audio input signal, and perform vocoding based on the enhanced features to produce an enhanced audio signal.

\* \* \* \* \*